(12) United States Patent
Kohno

(10) Patent No.: US 6,396,514 B1
(45) Date of Patent: *May 28, 2002

(54) COMMUNICATION SYSTEM FOR TRANSMITTING A PLURALITY OF IMAGES AND AUDIO INFORMATION

(75) Inventor: Akihiro Kohno, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/704,252

(22) Filed: Aug. 28, 1996

(30) Foreign Application Priority Data

Aug. 31, 1995 (JP) .............................. 7-223564

(51) Int. Cl.⁷ ................................. G09G 5/00
(52) U.S. Cl. ....................... 345/753; 345/2.1
(58) Field of Search ................. 345/115, 116, 345/127, 131, 329, 330, 332, 733, 734, 735, 748, 740, 753, 751, 752, 1.1, 1.2, 2.2; 348/13, 15

(56) References Cited

U.S. PATENT DOCUMENTS

| 4,965,819 A | * | 10/1990 | Kannes ........................ 348/15 |
| 5,073,771 A | * | 12/1991 | Satta et al. ................. 345/115 |
| 5,365,254 A | * | 11/1994 | Kawamoto ................... 345/131 |
| 5,627,978 A | * | 5/1997 | Altom et al. ............... 345/330 |
| 5,673,079 A | * | 9/1997 | Satoh .......................... 348/15 |
| 5,867,654 A | * | 2/1999 | Ludwig et al. ............. 345/330 |

* cited by examiner

Primary Examiner—Chanh Nguyen
(74) Attorney, Agent, or Firm—Fitzpatrick, Cella, Harper & Scinto

(57) ABSTRACT

A terminal capable of switching among a plurality of types of information is provided. A display unit for displaying a plurality of video information and image information inputted by an information input unit, an input information selection unit for selecting desired information from the input information displayed on the display unit and a switching output unit for switching to the input information selected by the input selection unit for output are provided. The input information is always manifested in the display unit so that an operator may switch to the desired input information while watching the manifested content to prevent the output of unintended input information.

17 Claims, 14 Drawing Sheets

FIG.9A

| 1 | Vol. 1 WHAT IS PATENT? |
|---|---|
| 2 | Vol. 2 HOW TO WRITE PATENT? |
| 3 | Vol. 3 ..... |
| 4 | Vol. 4 ..... |
| ⋮ | . . . |

FIG.9B

| 1 | COVER |
|---|---|
| 2 | CONTENTS |
| 3 | BACKGROUND |
| 4 | OBJECT |
| ⋮ | . . . |

COMMUNICATION SYSTEM FOR TRANSMITTING A PLURALITY OF IMAGES AND AUDIO INFORMATION

BACKGROUND OF THE INVENTION

1. Field of the Invention

The present invention relates to a communication terminal, a communication system and a communication method for making communication by selectively using a plurality of sources (tools).

2. Related Background Art

Recent advancement of compression coding technologies for video information, image information and audio information and population of digital communication lines are remarkable. As a result, recommendations such as service regulations and protocol regulations for AV (audio visual) services and multimedia multiplexing frame format regulations have been proposed.

The video information means motion picture information which can be electronically processed and which may be read into and from a computer through a video board. The video information may also be controlled such as play, stop and pause by a conventional computer application. It may also be recorded to and reproduced from a video equipment.

The image information means still image information which can be electronically processed and wich may be read into the computer by a scanner and created by a draw tool which is one of computer application software. Like the video information, the image information may be outputted to a monitor such as a CRT or an LCD.

The audio information means sound information which can be electronically processed and which may be read into the computer through a microphone and created by a synthesizer. The audio information may be outputted to a speaker. It may also be recorded to or reproduced from an audio equipment.

The electronic information may be transmitted and received among remote stations through a network. A communication system, for example, a TV conference system or a remote lecture system in which the electronic information is communicated among remote stations to display scenes of lecture by terminals located at remote stations connected through the network and output sound by speakers in order to electronically hold the lecture among the remote stations has been proposed.

In such a communication system, the information displayed on the monitor may be displayed in enlargement by using a scan converter or directly by using a projector. By registering image files in a form of list by a draw tool, the image files may be clicked by a mouse to sequentially display them.

The video information and the image information may be selectively outputted or transmitted by controlling a conventional switcher by the computer. In the past, an information switching process by a lecturer has been implemented by a flow chart shown in FIG. 10.

In FIG. 10, when an image switching process program is started, an event such as a key entry or mouse click is monitored in a step S1001. For example, as shown in FIG. 1, a switch 11 for switching the input information is displayed on a monitor screen to prompt a user to enter input information.

A "Camera" switch at the left end is a switch for selecting input information from a camera and a "Video" switch next to the left end is a switch for selecting input information from a video equipment. A "Draw" switch at the third from the left end is a switch for selecting input image information read by an OHP (overhead projector) or image information created by a draw tool.

When the input information from the camera is selected by the user, the process proceeds from a step S1002 to a step S1003 to read the input video information of the camera and corresponding audio information into the computer. The video information thus read is displayed on the monitor in a next step S1004.

In a step S1011, the video information displayed on the monitor is outputted to a projector, and in a step S1012, the audio information read in the step S1003 is reproduced. At the same time, in a step S1013, the video information and the audio information are transmitted to the network.

When the input video information from the video equipment is selected by the user, the process proceeds from a step S1005 to a step S1006 to read the input video information of the video equipment and corresponding audio information into the computer. The read video information is displayed on the monitor in a next step S1007.

Thereafter, the video information displayed on the monitor is outputted to the projector in a step S1011 in the same manner as that described above, and in a step S1012, the audio information read in the step S1006 is reproduced. At the same time, in a step S1013, the video information and the audio information are transmitted to the network.

When the image information is selected by the user, the process proceeds from the step S1008 to a step S1009 and the image information and the corresponding audio information are read into the computer. The read image information is displayed on the monitor in a next step S1010.

In the next step S1011, the image information displayed on the monitor is outputted to the projector and in a step S1012, the audio information read in the step S1009 is reproduced. At the same time, in a step S1013, the image information and the audio information are transmitted to the network.

On the other hand, a destination communication terminal in a lecture location receives the video information, the image information and the audio information which were transmitted to the network, displays them on a monitor or a projector and reproduces from a speaker. In this manner, the TV conference system and the remote lecturing system which includes the switching of input information by using terminals connected between remote stations through the network is attained.

On the other hand, in a conventional conference or lecture in which a lecturer and audience are at the same place and uses a blackboard or an OHP and does not use an electronic medium or communication, a presentator or lecturer manages by himself OHP sheets or a video tape to be used during the lecture so that he may check them at any time as required.

Accordingly, the switching of the materials to be used may be relatively smoothly conducted.

However, in the prior art remote lecturing system described above, it is necessary to switch the input information by depressing the switch 110 as shown in FIG. 11. Accordingly, a switching command from the user through the manipulation of the switch 110 is received by the computer so that only the commanded input information is displayed, outputted to the projector and transmitted to the network.

In this case, when the image information is to be utilized by depressing the "Draw" switch, the image information derived by reading the content of the OHP sheet is stored in the memory, not shown, as a file and each image information is sequentially read, displayed and transmitted by clicking a mouse. Accordingly, if the lecturer forgets the sequence of reading of the image information, he cannot identify the contents of the next image information to be transmitted.

When a draw tool is used instead of the OHP, the prepared image information is stored as the image file in a form of list and each of the image information is sequentially displayed by clicking the mouse. Accordingly, the lecturer again may not identify the contents of the next page.

When the video information from a camera of the video information from a video tape is to be used, the display or the transmission is conducted only when the switching of the input information is commanded by depressing a "Camera" switch or a "Video" switch.

Accordingly, the lecturer cannot identify the video information to be displayed next.

As a result, in the prior art conference system or remote lecture system, the material or camera video image which the lecturer does not intend might be displayed or transmitted. In order to prevent such from occurring, it is necessary to repeat the sequence of the conference or lecture in rehearsal, which is time consuming and troublesome.

SUMMARY OF THE INVENTION

It is an object of the present invention to provide a communication terminal, a communication system and a communication method which solve the above problems.

It is another object of the present invention to provide a communication terminal, a communication system and a communication method which can selectively transmit a desired one of a plurality of information.

In order to achieve the above objects, in accordance with the present invention, there is provided a communication terminal device having input means for inputting each of a plurality of video information and a plurality of image information and output means for switching and outputting their input information, comprising display means for displaying a plurality of input information inputted by the input means and selection means for selecting any of the respective input information displayed by the display means. The input information selected by the selection means is switched by the output means for output.

It is other object of the present invention to provide a communication terminal, a communication system and a communication method having a new function.

Other objects and features of the present invention will be apparent from the following description of the preferred embodiments and the accompanying drawings.

BRIEF DESCRIPTION OF THE DRAWINGS

FIGS. 9A and 9B show examples of sequence maintenance of lecture materials;

DETAILED DESCRIPTION OF THE PREFERRED EMBODIMENTS

One embodiment of the present invention is now explained with reference to the accompanying drawings.

Figure 1:
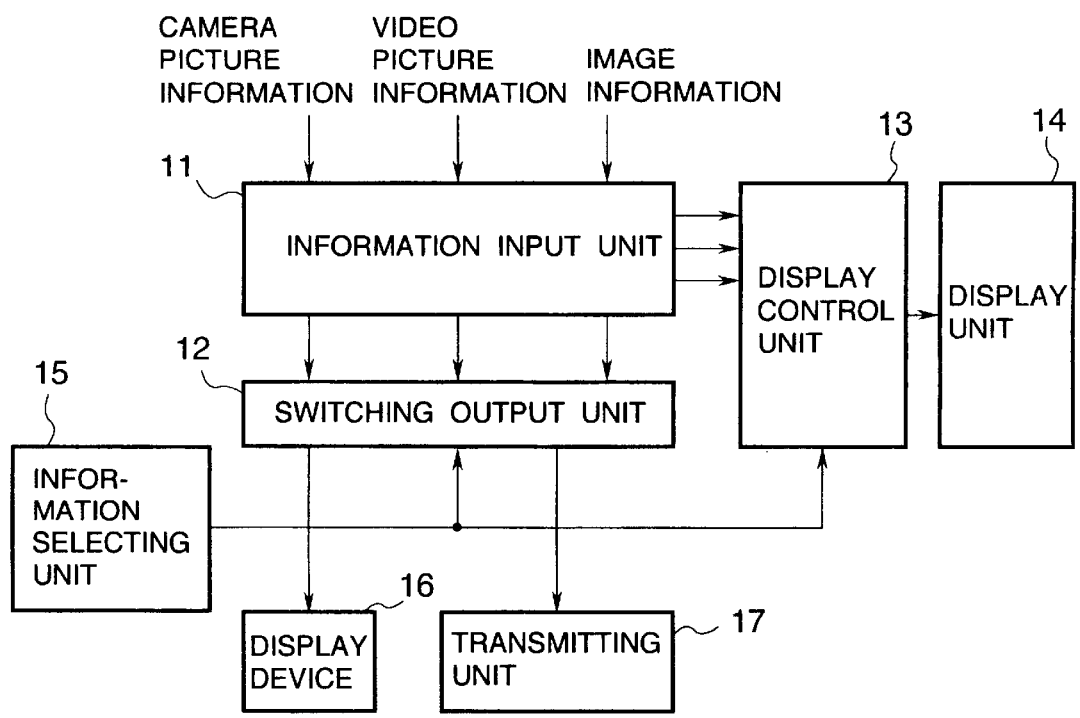
FIG. 1 shows a functional block diagram illustrating elementary features of one embodiment of the present invention.
Figure 2:
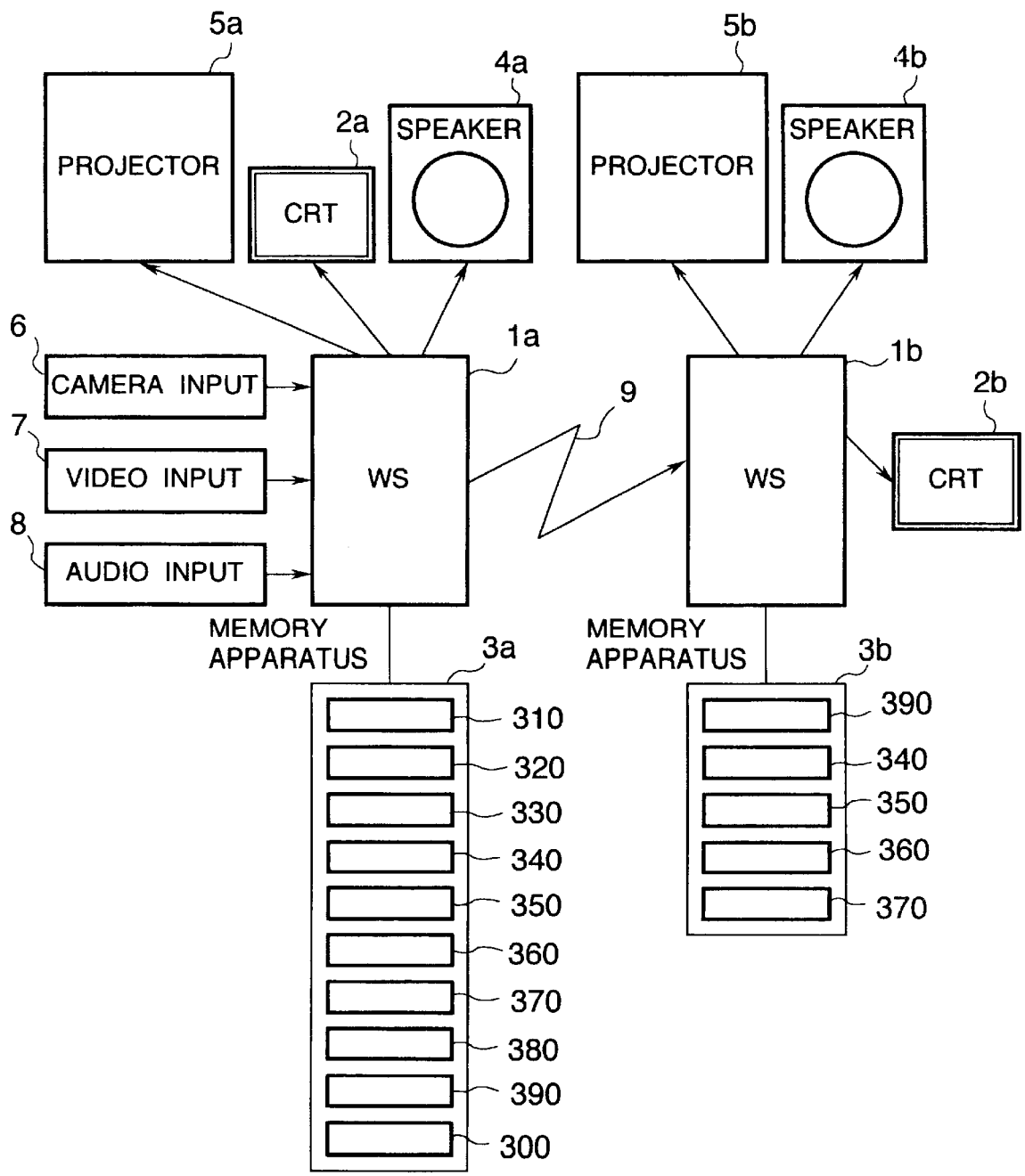
FIG. 2 shows a configuration of a communication system such as a TV conference system or a remote lecturing system in accordance with a first embodiment.

FIG. 1 shows a functional block diagram illustrating elementary features of one embodiment of the present invention and FIG. 2 shows a block diagram of a configuration of a remote lecturing system in accordance with a first embodiment which uses a terminal device of the present invention. FIG. 2 is explained first.

In FIG. 2, numerals 1a and 1b denote computers including CPUs such as work stations (hereinafter referred to as WSs) to which keyboards and mouses are connected, numerals 2a and 2b denote monitors such as CRTs, LCDs or FLCDs, numerals 3a and 3b denote memories for storing programs and data, numerals 4a and 4b denote audio output units such as speakers, numerals 5a and 5b denote image output units such as projectors, numeral 6 denotes a camera input unit for inputting camera picture information, numeral 7 denotes a video input unit for inputting video picture information, and numeral 8 denotes an audio input unit such as a microphone for inputting audio information.

As shown in FIG. 2, the terminal of a lecture location (which is to be used by a lecturer) comprises the WS 1a, the monitor 2a, the memory 3a, the speaker 4a, the projector 5a, the camera input unit 6, the video input unit 7 and the audio input unit 8. On the other hand, the terminal at an audience location (which is to be used by an audience) comprises the WS 1b, the monitor 2b, the memory 3b, the speaker 4b and the projector 5b.

The WS 1a at the lecture location and the WS 1b at the audience location are connected through the network 9 to communicate the video information, the image information and the audio information.

In the present embodiment, the lecture between remote locations may be conducted by connecting the terminal at the lecture location and the terminal at the audience location. Alternatively, the terminal at the lecture location may be used as the terminal to be used by the lecturer at the same location (the lecture location) without using the network to use it as a terminal device for conducting the lecture without communication.

The memory 3a at the lecture location stores a video read program 310, an image generation program 320, an audio read program 330, a video display program 340, an image display program 350, an audio reproduction program 360, an image output program 370, an information transmission program 380, an information reception program 390 and an information switching program 300.

The video read program 310 conducts the reading of the input video information from a video board, not shown, (included, for example, in the camera input unit 6 or the video input unit 7) into the WS 1a under control of the WS. The image generation program 320 generates the image information on the WS 1a and it may comprise a draw tool or a paint tool. The generated image information is stored in an area of the memory 3a other than the area in which the programs are stored. The audio read program 330 conducts the reading of the input information from the audio input unit 8 such as the microphone into the WS 1a under control of the WS.

The video display program 340 conducts the displaying of the video information read into the WS 1a on the screen of the monitor 2a. The image display program 350 conducts the displaying of the image information generated by the WS 1a on the screen of the monitor 2a, and it may be a viewer or a drawing tool. The audio reproduction program 360 conducts the reproducing of the audio information read into the WS 1a by the speaker 4a.

The image output program 370 conducts the outputting of the video information and the image information displayed on the monitor 2a to the projector 5a. The information transmission program 380 and the information reception program 390 conduct the transmitting and the receiving of the video information, the image information and the audio information through the network. The information switching program 300 conducts the switching of the input information.

Figure 11:
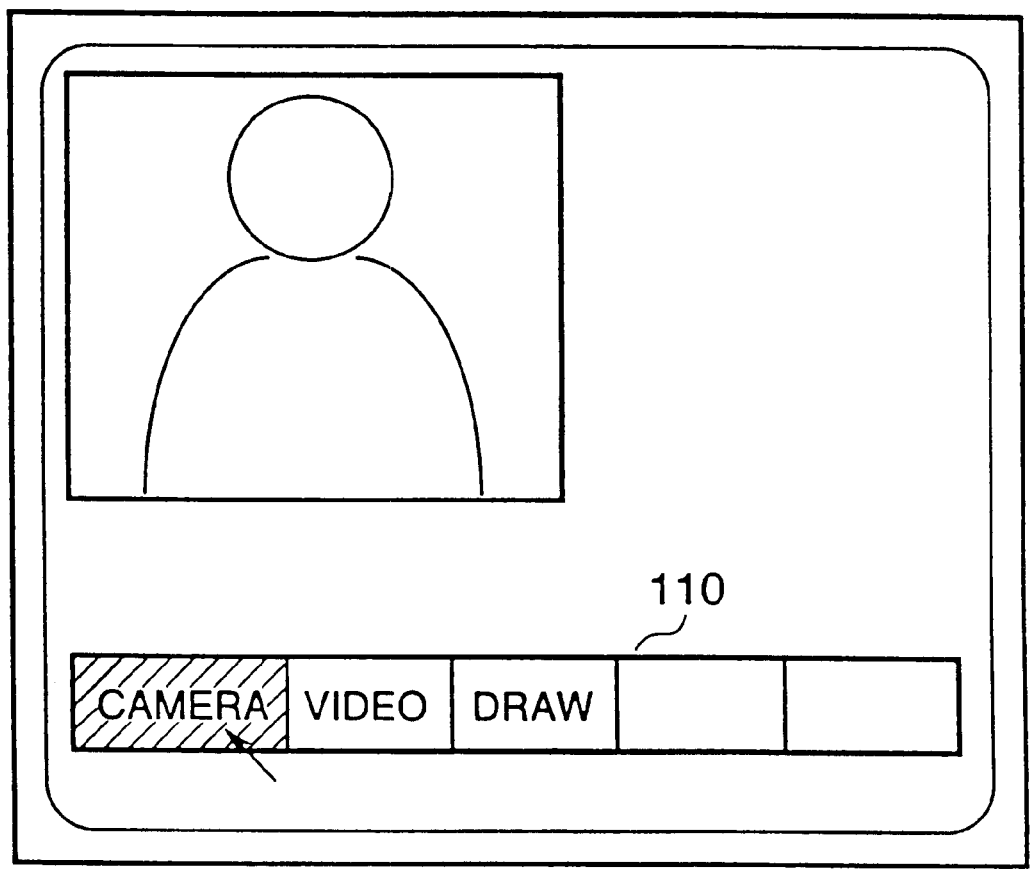
FIG. 11 shows a configuration of a prior art monitor image.

In the communication system as described in the prior art, the switching command from the user by the manipulation of the switch 110 shown in FIG. 11 is accepted to display only the commanded input information on the monitor, outputting it to the projector or transmitting it to the network to conduct the switching of the input information.

On the other hand, in the present embodiment, the information switching program 300 causes the switch unit to display the input video information and the input image information to present all types of input information in a form of multi-image. Accordingly, in the present embodiment, the information switching program 300 also conducts the display control.

Figure 3:
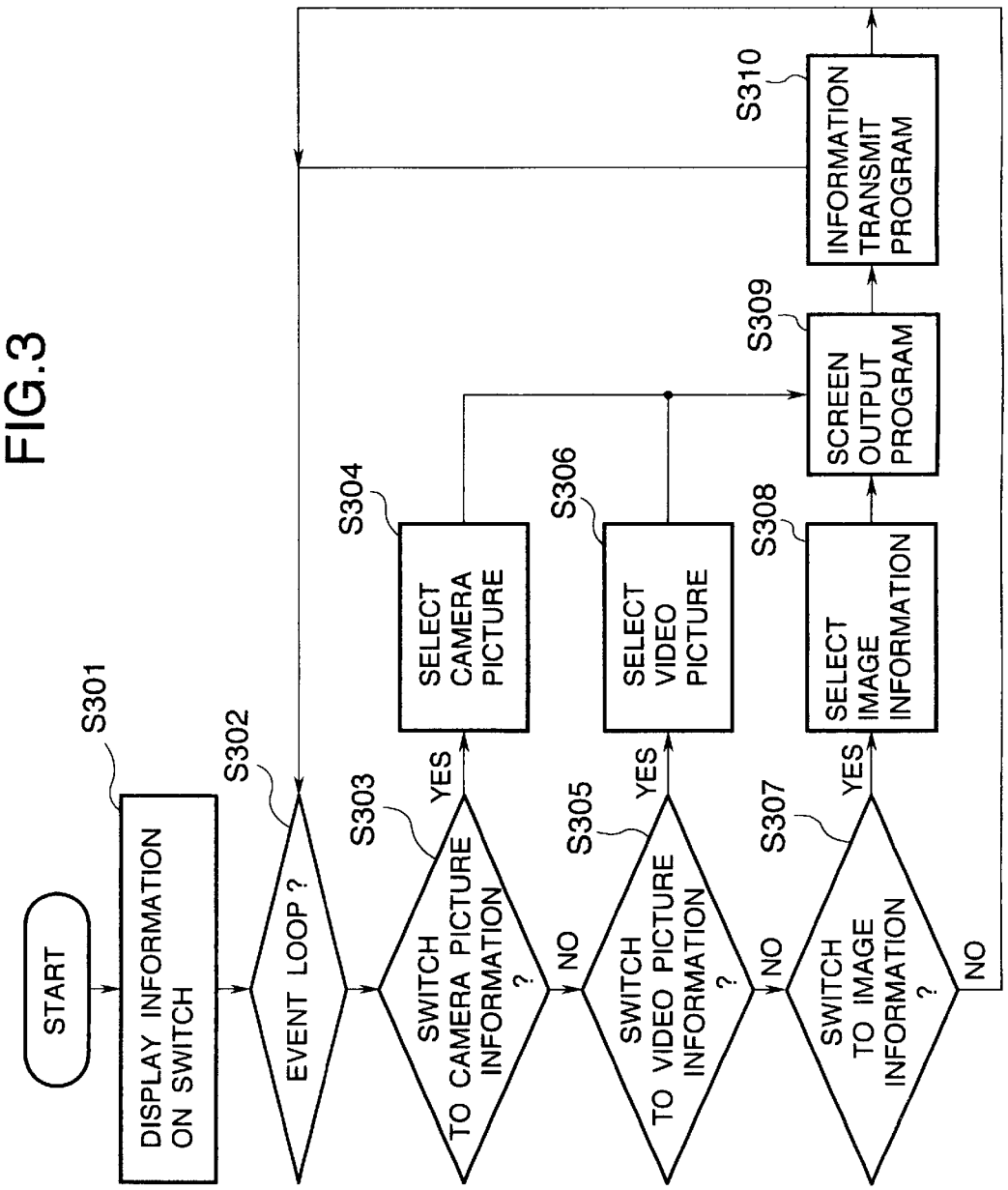
FIG. 3 shows a flow chart of a content of a process conducted by an information switching program in accordance with the first embodiment.

FIG. 3 shows a flow chart for illustrating a content of a process conducted by the information switching program 300.

Figure 4:
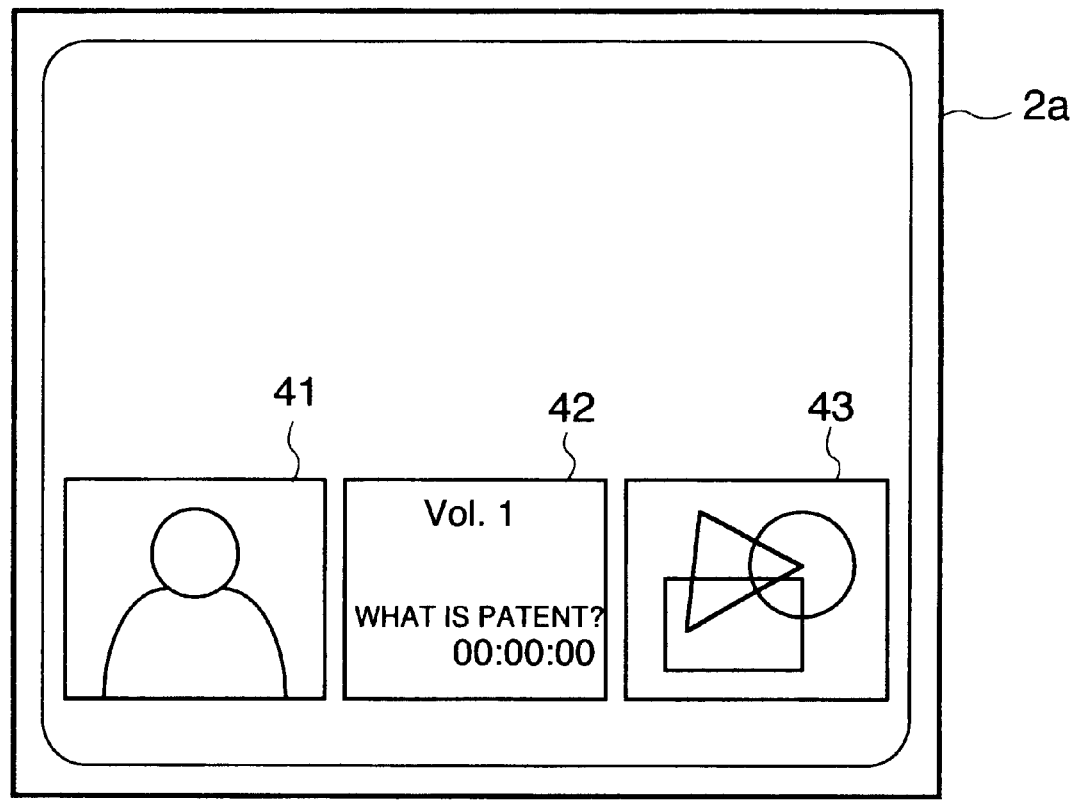
FIG. 4 shows an example of interface for the input switching in accordance with the first embodiment.

Referring to FIG. 3, in a step S301, the video information and the image information are displayed on the monitor side by side as shown in FIG. 4 instead of the user interface which is the input information switch 110 in the prior art. The video read program reads video of a small number of input pixels to fit to the size of the screen. The video display program reads out the information from the memory 3 with a coarse number of pixels. Accordingly, the load of the WS to the process is reduced.

The leftmost window 41 in FIG. 4 is a window for presenting a content of the camera picture information, the middle window 42 is a window for presenting a content of the video picture information and the rightmost window 43 is a window for presenting a content of the image information generated by the draw tool. Those video and image windows are normally displayed in a smaller scale as they go down on the screen for a sake of convenience of the construction of the screen of the monitor 2a. The display position is not limited to the bottom of the screen but it may be displayed at any position so long as the various information described above may be displayed for visual confirmation.

In a step S302, an input information switching event is monitored. The event may be generated by clicking the window to be switched by a pointing device such as a mouse which the computer 1a possesses. This operation may also be manipulated by a keyboard. During this period, the video display program 340 and the image display program 350 independently display the video and the images on the monitor as shown in FIG. 4. A plurality of video display program 340 and image display program 350 may be simultaneously executed.

For example, when a switching event to the camera occurs, the process proceeds from a step S303 to a step S304 and the camera picture information displayed on the monitor 2a is selected. By this selection, the input switching to high resolution is commanded from the WS to the camera. In a step S309, the image information selected in the manner described above is outputted to the projector 5a at the high resolution by the image output program 370. At this time, the reading of the audio information and the reproduction thereof are switched to the process to read and reproduce the audio information corresponding to the camera picture information.

In a next step S310, the camera picture information and the corresponding audio information are transmitted to the network 9 by the information transmission program 380.

Figure 5:
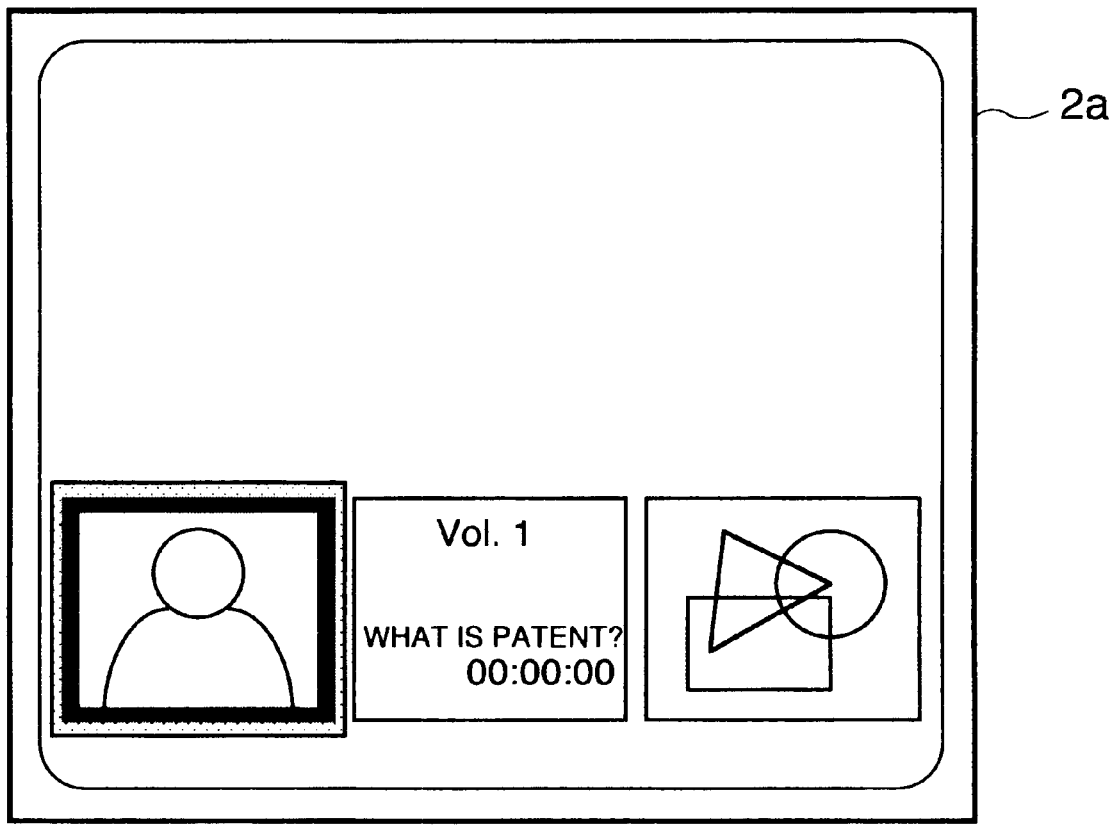
FIG. 5 shows an example of transmission image in accordance with the first embodiment.
Figure 6:
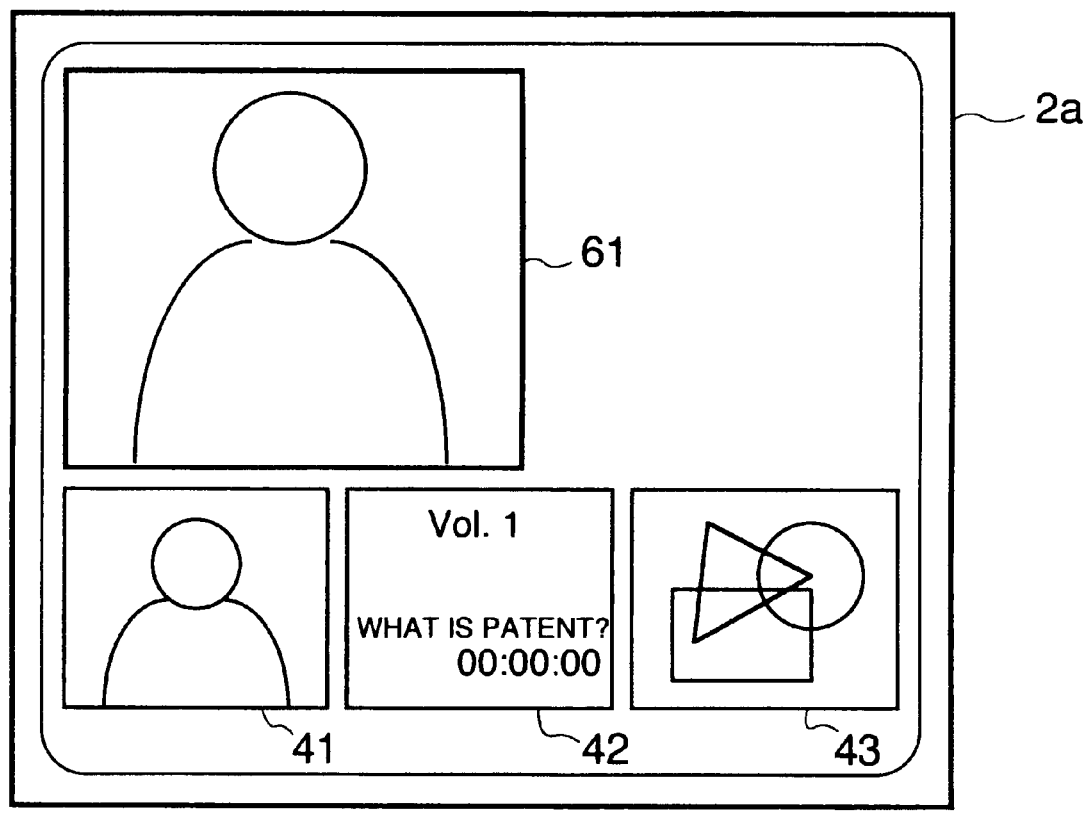
FIG. 6 shows another example of the transmission image in accordance with the first embodiment.

At this time, in order to identify the information being transmitted, a modification may be made to a window frame of the information being transmitted as shown in FIG. 5 or the information being transmitted may be displayed in enlargement as shown in FIG. 6.

When the display in enlargement is made as shown in FIG. 6, the screen of the image displayed on the projector 5a by the image output program 370 is large and the image quality is improved. Further, since only the selected information is displayed in enlargement, the display space may be efficiently utilized. From a standpoint of image construction, the image is easy to view since the image is displayed in enlargement.

When a switching event to the video picture information occurs, the process proceeds from a step S305 to a step S306 to select the video picture information displayed on the monitor 2a. When a switching event to the image information such as the draw tool occurs, the process proceeds from a step S307 to a step S308 to select the image information displayed on the monitor 2a. Depending on the selection, the number of read pixels from the memory 3 is increased to display the image with a high quality on the monitor.

When the process of the step S306 or the step S308 is completed, the process proceeds to a step S309 and the selected video information or image information is outputted to the projector 5a by the image output program 370. At this time, the reading and the reproduction of the audio information are switched to the process to read and reproduce the audio information corresponding to the video picture information or the image information.

In a next step S310, the video picture information and the corresponding audio information or the image information and the corresponding audio information are transmitted to the network 9 by the information transmission program 380 and the process returns to the event loop of the step S302.

FIG. 1 shows a block diagram which represents the above process by function.

In FIG. 1, an information input unit 11 inputs a plurality of video information (camera picture information and video picture information) and the image information of the draw tool. A switching output unit 12 switches the plurality of input information and outputs it to a display unit (large projector) 16 and a transmitting unit 17.

A display control unit 13 receives the input information from the information input unit 11 and controls the display of the input information to a display unit 14 (corresponding to the monitor 2a of FIG. 2). Namely, it controls to display all types of input information inputted from the information input unit 11 on the windows 41, 42 and 43 as shown in FIG. 4. At this time, the display image has a small number of pixels.

When the user selects one of the input information displayed on the display unit 14 by using an input information selecting unit 15 (by clicking a mouse on the desired window), the image having a large number of pixels is inputted depending on the selection and the switching output unit 12 switches to the selected input information and outputs it to the display device 16 and the transmitting unit 17.

The display control unit 13 controls the display on the display unit 14 to identify the input information selected by the input information selecting unit 15 (the input information outputted to the display device 16 and transmitted to the transmitting unit 17). For example, a modification may be applied to a window frame of the selected input information as shown in FIG. 5 or the selected information may be displayed in enlargement as shown in FIG. 6.

In this manner, in accordance with the present embodiment, the information necessary for the lecture may be selected while the information available to the user is continuously displayed on the monitor screen. Accordingly, the inadvertent selection by the lecturer of unintended lecture material is prevented and a proper lecture material may be utilized.

By using the enlarged display as shown in FIG. 6, the information necessary for the lecture may be displayed on the projector as high grade information. By sending the high grade original information in the enlarged scale to the network 9, the information necessary for the lecture may be displayed at a remote location (the audience location) on the projector 5b as the high grade information.

A second embodiment of the present invention is now explained.

In the first embodiment described above, the video information and the image information are arranged in the three windows 41–43 to form the information switch, and the information selected by manipulating the switch is outputted to the projector 5a for transmission to the network 9.

In the second embodiment to be described below, when the selected information is displayed in enlargement as shown in FIG. 6, different information are displayed between the output to the projector 5a and the display of the enlarged window 61 for the transmission to the network 9, and the display on the windows 41–43 in the selected original size so that the material to be next used is identified during the lecture.

Figure 7:
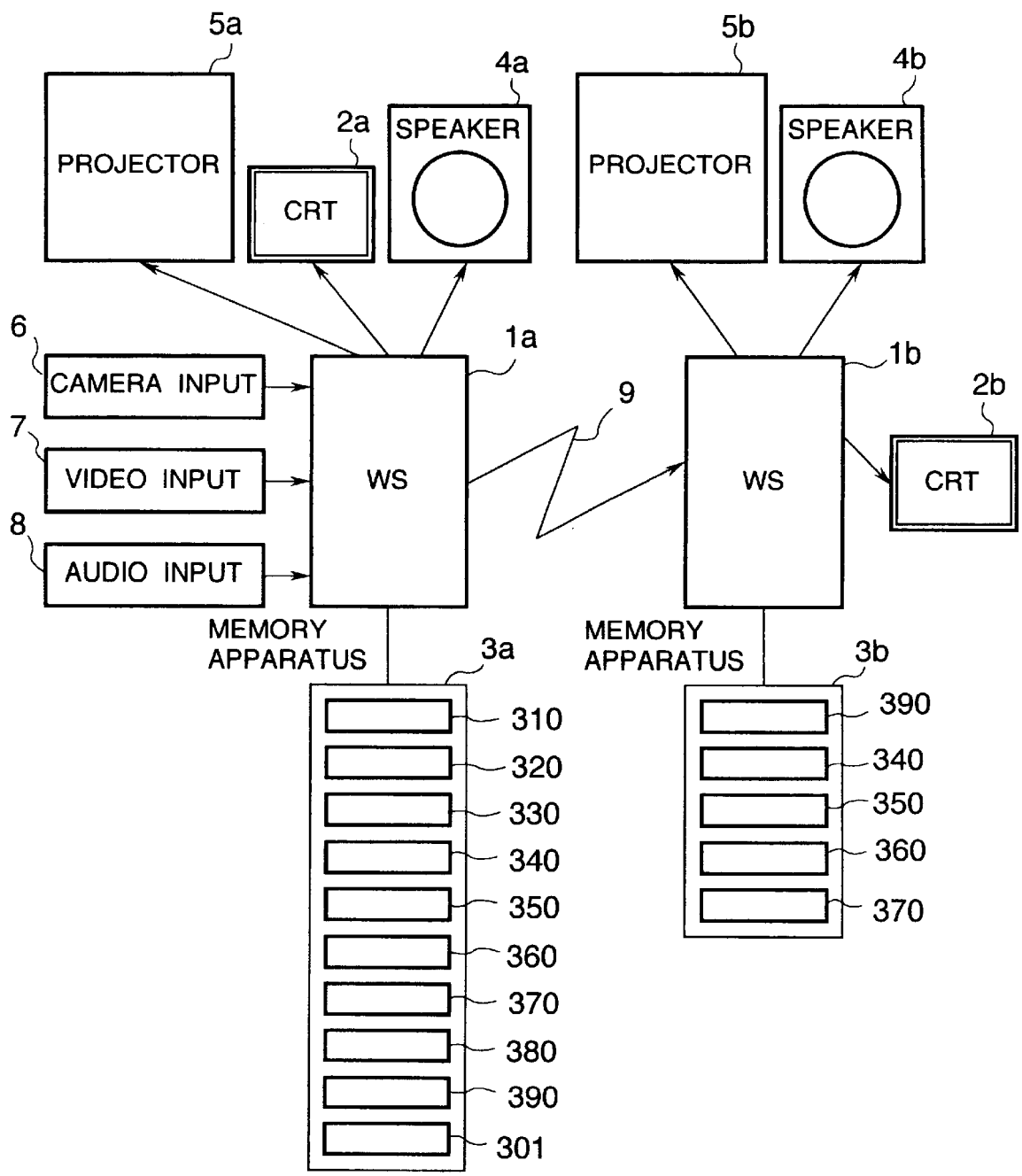
FIG. 7 shows a configuration of a remote lecturing system in accordance with a second embodiment.
Figure 8:
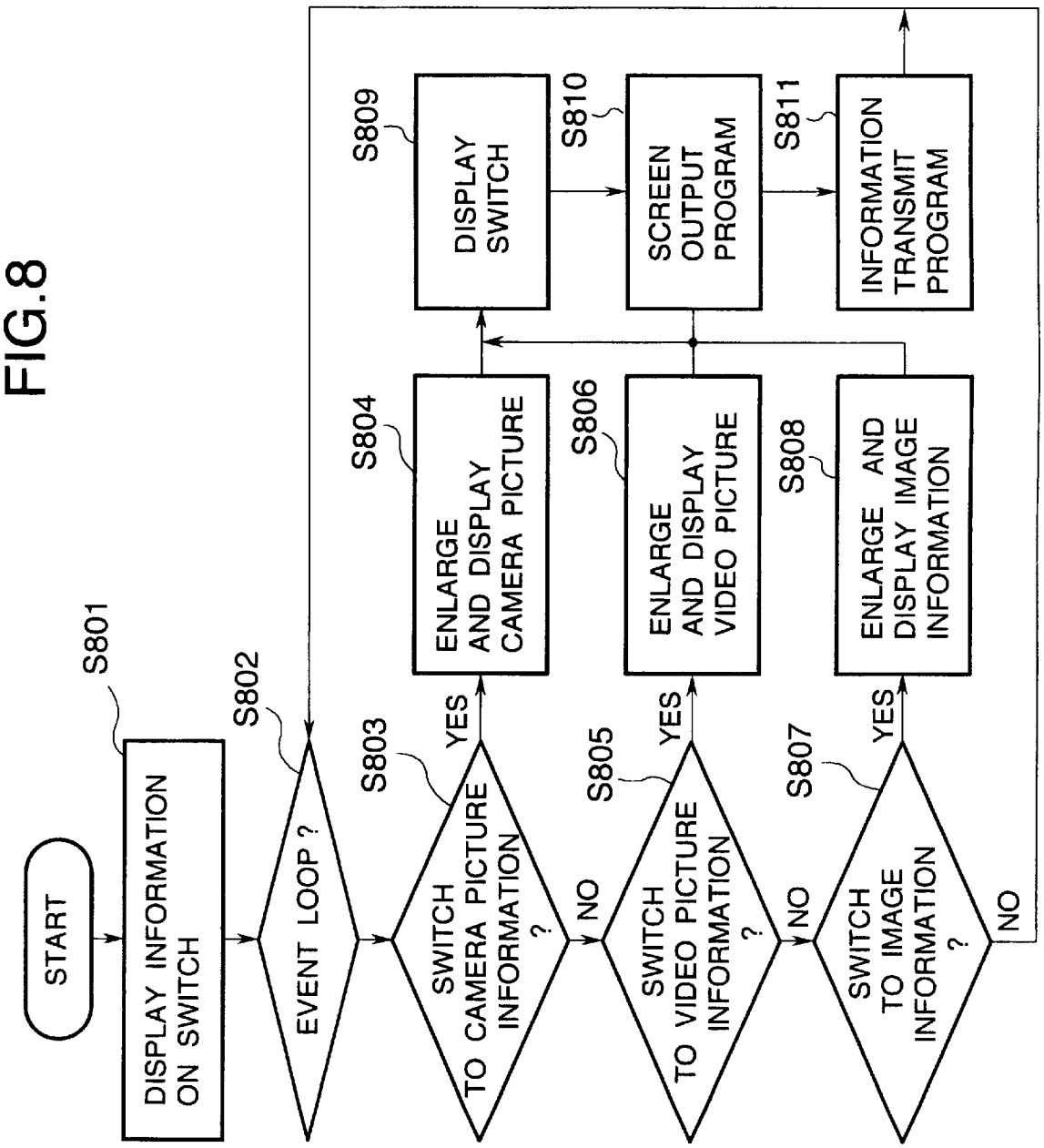
FIG. 8 shows a flow chart of for illustrating a content of a process conducted by an information switching program in accordance with the second embodiment.
Figure 10:
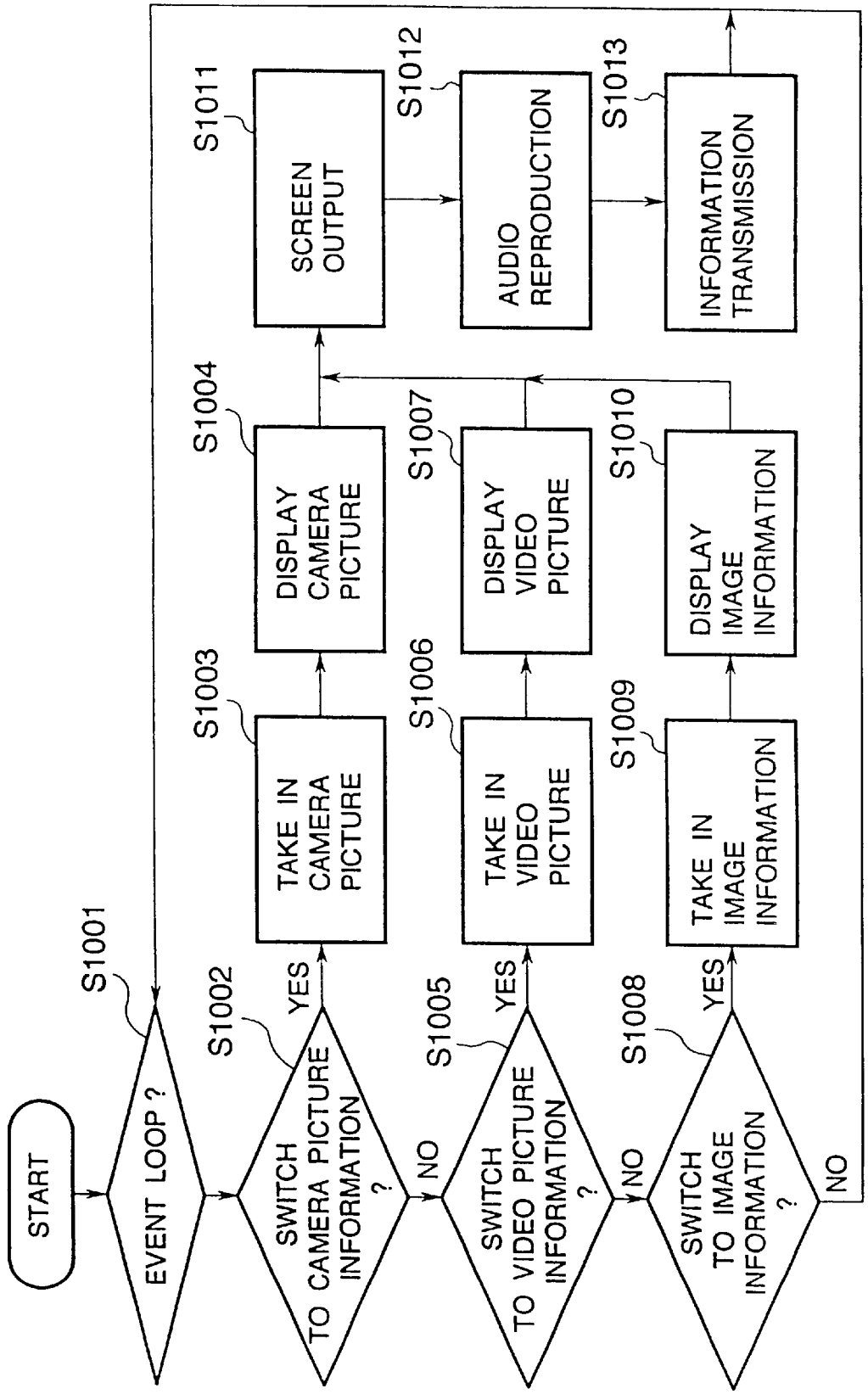
FIG. 10 shows a flow chart for illustrating a content of an input information switching process in a prior art remote lecturing system.

FIG. 7 shows a block diagram of a remote lecturing system of the present embodiment. In FIG. 7, the information switching program 300 of FIG. 2 has been changed to another information switching program 301. FIG. 8 shows a flow chart representing a process to be conducted by the information switching program.

In FIG. 8, in a step S801, the camera picture information, the video picture information and the image information area are displayed, side by side, on the windows 41, 42 and 46 as the input information switch as they are in the step S301 of FIG. 3. Then, in a step S802, an input information switching event is monitored.

Like in the first embodiment, the event may be generated by clicking the window to be switched by the pointing device such as the mouse. During this period, the video display program 340 and the image display program 350 independently display the video and the image as shown in FIG. 4.

When a switching event to the camera picture information occurs, namely, when the window 41 as the switch to the camera picture information is clicked by the mouse, the process proceeds from a step S803 to a step S804 to display and reproduce the currently selected camera picture information in the enlarge window 61 in enlargement.

At this time, the camera picture information is selected as it is as the display image to the camera switch window 41.

The reading and the reproduction of the audio information are switched to the reading and the reproduction of the audio information corresponding to the camera picture information.

When a switching event to the video picture information occurs, namely, when the window 42 as the switch to the video picture information is clicked by the mouse, the process proceeds from a step S805 to a step S806 to display and reproduce the currently selected video picture information in enlargement in the enlarge window 61 of FIG. 6.

At this time, the video picture information to be next used is selected for displaying it in the switch window 42 for the video.

The reading and the reproduction of the audio information are switched to the reading and the reproduction of the audio information corresponding to the video picture information.

The video picture information to be next used which is displayed in the switch window 42 for the video may be video information which allows to grasp the content of the video picture information at a glance such as a pause image of a video title of the next video. Such title image video information is managed in a form of list as shown in FIG. 9A and each time the switching to the video picture information takes place, the control is shifted to the next video picture information.

Accordingly, as shown in FIG. 6, when the switching to the video picture information is conducted while the title image "Vol. 1, WHAT IS PATENT?" is displayed in the switch window 42 for the video, the corresponding video picture information is displayed in the enlarge window 61 and the next title image "Vol. 2, HOW TO WRITE PATENT" is selected for the display in the switch window 42 for the video. In this case, two video image display programs 340 are run.

Alternatively, the pause image of the video title may be read as the image information and the image information may be displayed on the switch window 42 for the video by using the image display program 350. In this case, the video image display programs 340 are run one for each of the enlarge windows 61 and the image display programs 350 are run one for each of the video switch windows 42.

When a switching event to the image information such as the draw tool occurs, namely, when the windows 43 as the switch to the image information is clicked by the mouse, the process proceeds from a step S807 to a step S808 to display the currently selected image information in the enlarge window 61 in enlargement.

At this time, the image information to be next used is selected for the display on the image information switch window 43.

The reading and the reproduction of the audio information are switched to the reading and the reproduction of the audio information corresponding to the image information.

The image information to be next used which is displayed on the image information switch window 43 is one sheet of image information such as an OHP sheet of the next page. The image information of the OHP sheet is managed in a form of list as shown in FIG. 9B, and each time the switching to the image information takes place, the control is sequentially shifted to the next image information. In this case, two image display programs 350 such as the draw tools are run.

When the process of the step S804, S806 or S808 is completed, the process proceeds to a next step S809 to display the information selected for the next use on the corresponding switch window. The step S809 may be combined with the step S804, S806 or S808.

In the step S809, the display programs corresponding to the selected switch windows run independently. Namely, when the switching to the camera picture information or the video picture information is conducted, the video display program 340 is executed, and when the switching to the image information is conducted, the image display program 350 is executed.

In a step S810, the video information or the image information displayed in enlargement on the enlarge window 61 of the monitor 2a is outputted to the projector 5a.

In a next step S811, the video or image information displayed on the enlarge window 61 and the corresponding audio information are transmitted to the network 9 by the information transmission program 380 and the process returns to the event loop of the step S802.

In accordance with the present embodiment, the information necessary for the lecture may be selected while the information available to the user is continuously displayed on the monitor 2a. Accordingly, the inadvertent selection by the lecturer of the unintended lecture material is avoided and the proper lecture material can always be selected.

Further, since the material to be used next to the currently used material, that is, the material which is displayed on the enlarge window 61, outputted to the projector 5a and transmitted to the network 9 is identified in the corresponding switch window, the material which may be used in the lecture can be explicitly informed to the lecturer in advance.

In the second embodiment, the material currently used is displayed in the enlarge window 61 and the materials to be used next are displayed in the switch windows 41–43. Since the currently used material is also displayed on the projector 5a, the materials to be used next may be simply displayed in the switch windows 41–43 without using the enlarge window 61.

Since the display means for displaying the plurality of input video information and image information is provided, the contents of all of the input information are always manifested and the user may select the desired input information while watching the manifested contents to utilize appropriate input information.

In accordance with other feature, since the input information selected by the selection means is always manifested, the user may select any one of the plurality of input information while watching the available input information as well as the actually selected input information.

In accordance with other feature, since the input information which is to be used next to the currently used input information is always manifested, the user may select one of the plurality of input information while watching the available input information and the actually selected input information as well as the information to be next used and the input information may be used in a more precise manner.

Third Embodiment

In the second embodiment, the input information to be next used is manifested. In the third embodiment, all of the video information or image information stored in the memory 3 or a predetermined number of sheets (for example, three sheets) to be used next are displayed.

The present embodiment may be implemented by proving the same number of video image display programs and the image display programs as that the number of sheets displayed. Other construction is same as that of the second embodiment.

Fourth Embodiment

In the fourth embodiment, in addition to the displays of the first, second and third embodiments, a display 14 is provided to continuously display the video picture information or the image information which is frequently used during the lecture.

Figure 12:
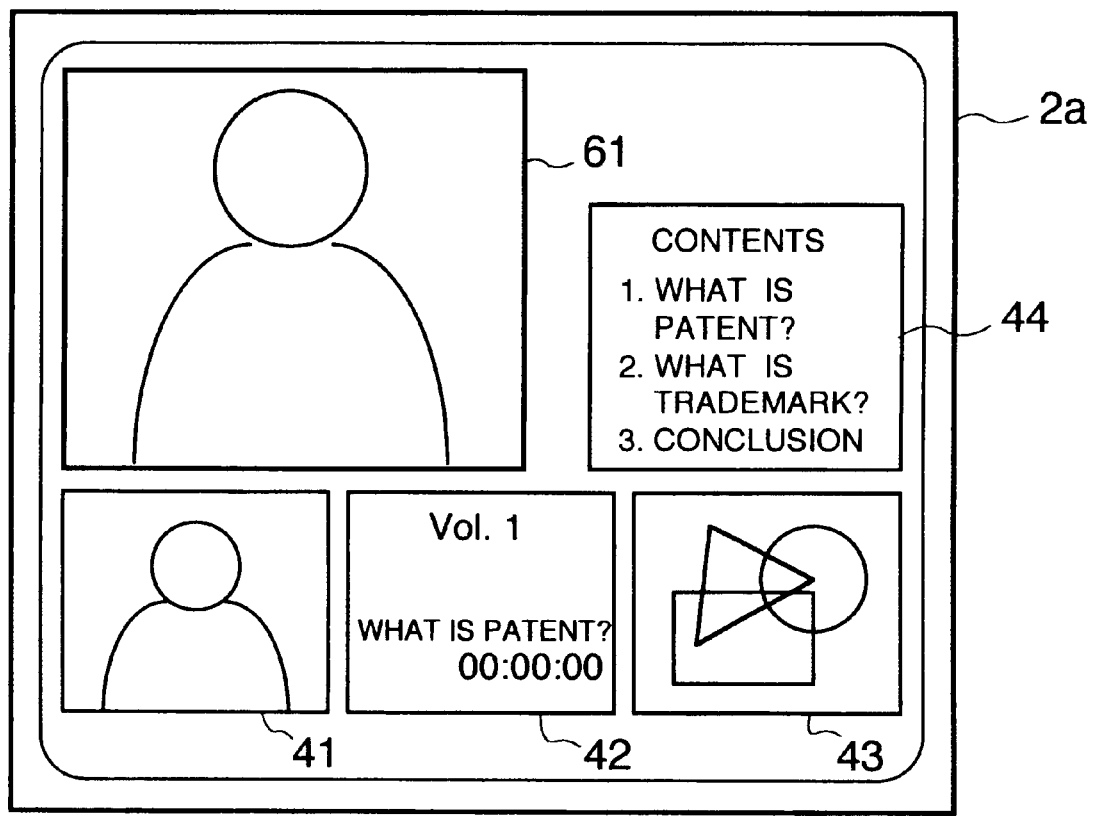
FIG. 12 shows an example of display in a fourth embodiment.

An example of display in the fourth embodiment is shown in FIG. 12.

In FIG. 12, the like elements to those shown in FIG. 6 are designated by the line numerals.

In FIG. 12, numeral 44 denotes video picture information which is frequently used by the lecturer. By selecting it by clicking the mouse as it is in the first, second and third embodiments, it may be transmitted to the destination terminal.

In accordance with the present embodiment, the information to be frequently used in the lecture may be instantly transmitted.

The display of the information 44 is not limited to one but a plurality of such information may be displayed. In this case, a plurality of display programs are provided.

Fifth Embodiment

In the fourth embodiment, the frequently used information 44 is always displayed to facilitate the transmission of the frequently used information. While the same information is frequently used, it is always transmitted.

In the fifth embodiment, the frequently used information is transmitted only once. An identifier to indicate that it is to be stored in the memory 3 of the destination terminal is added to the information and it is transmitted to the destination terminal.

In the destination terminal, when it recognizes the identifier, it stores the information in the memory 3.

In response to the next access to the information 44, a command to display the information 44 on the destination terminal 1b is sent from the terminal 1a to the terminal 1b instead of transmitting the information 44.

In response to the command, the destination terminal extracts and displays the information 44 from the memory 3b.

In accordance with the present embodiment, the frequently used information is not transmitted each time it is to be used but it is transmitted only once the only the command is sent at and second and following use so that the number of times of transmission of the information is reduced and the communication cost is reduced.

Sixth Embodiment

A sixth embodiment facilitates questions and answers at the end of the lecture.

Figure 13:
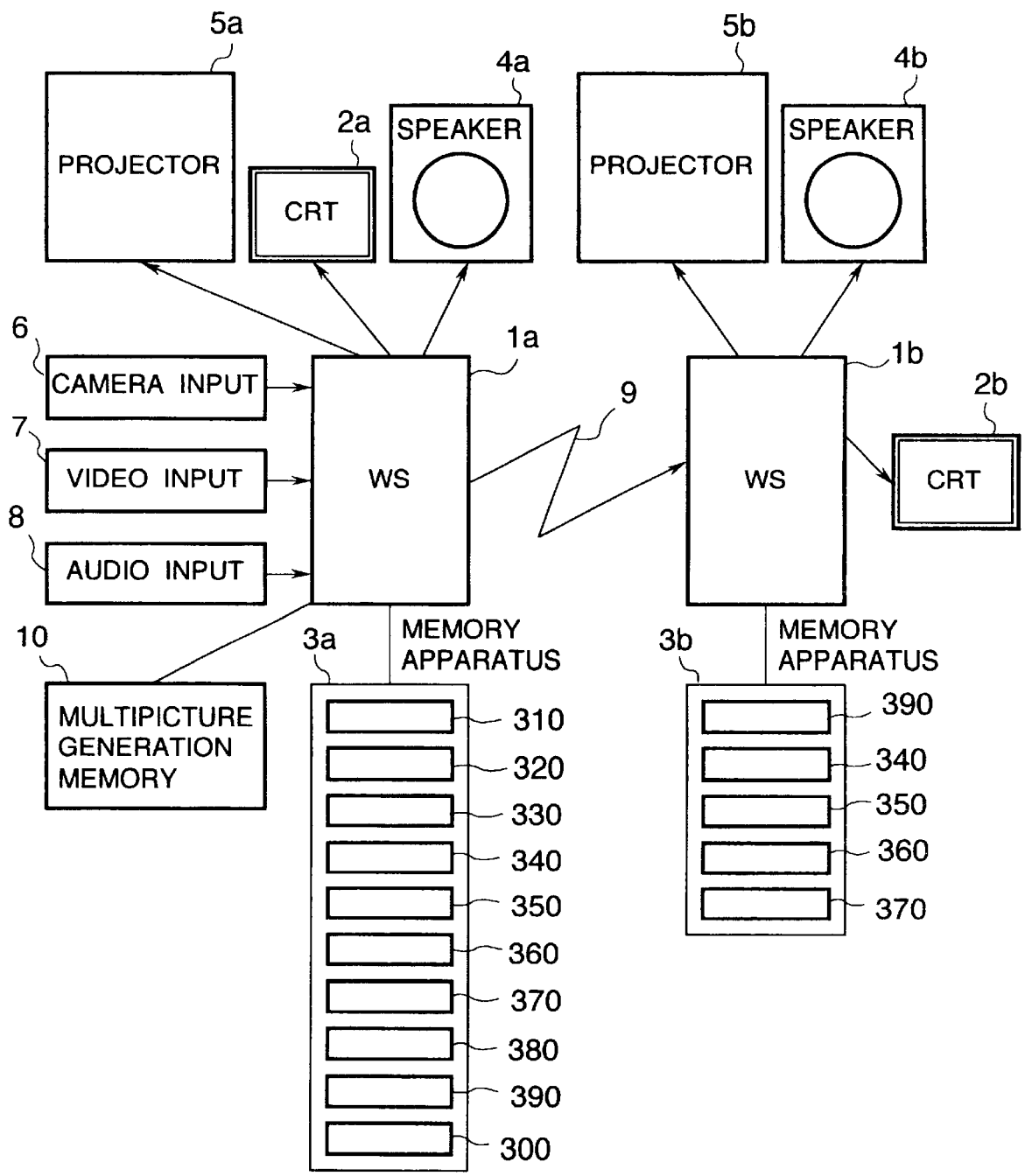
FIG. 13 shows a configuration of a sixth embodiment.
Figure 14:
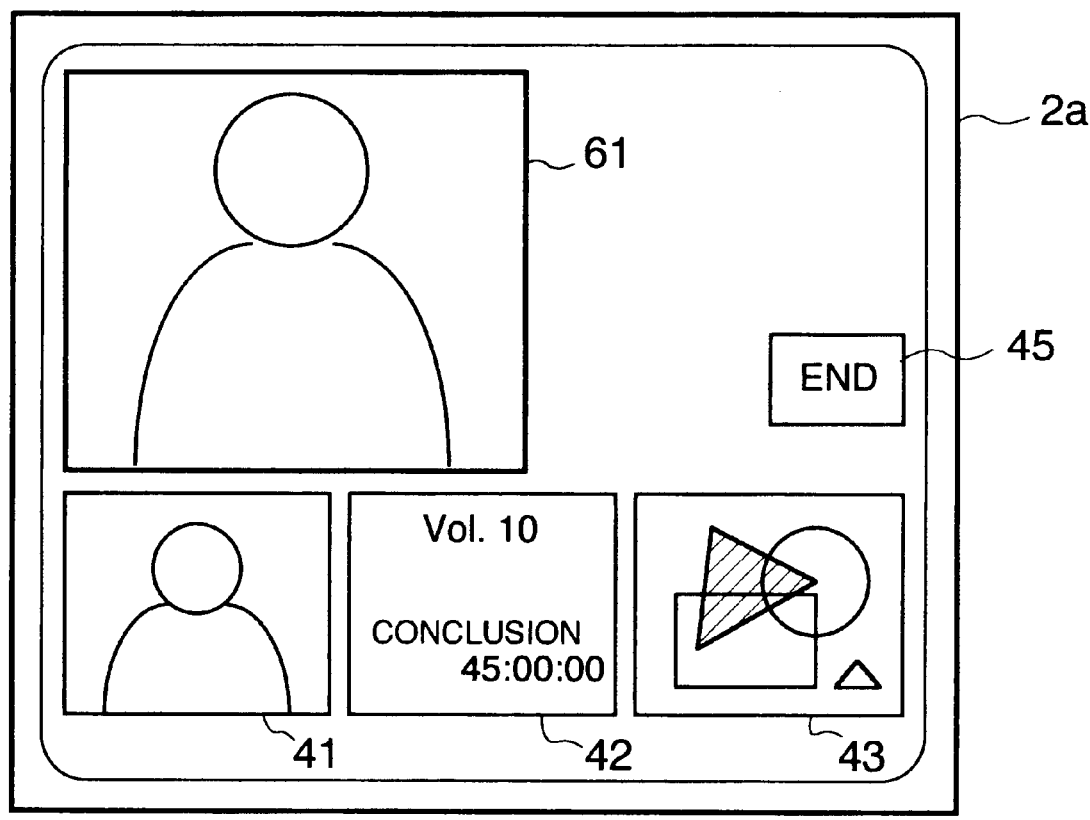
FIG. 14 shows an example of display in the sixth embodiment.

In the sixth embodiment, a function to generate multi-images of the materials used in the lecture is provided at the terminal of the lecturer. A configuration of the present embodiment is explained with reference to FIGS. 13 and 14 in which the like elements to those shown in FIG. 1 are designated by the like numerals and the explanation thereof is omitted.

Numeral 10 denotes a step for generating multi-images by the materials used in the lecture at the end of the lecture. At the end of the lecture, the lecturer points an end switch 45 by the mouse. In response to the end switch 45, the step S10 generates the multi-images comprising a predetermined number of materials used in the lecture. The generated multi-images are transmitted to the destination terminal 1b. The operator at the destination terminal selects images related to the questions from the multi-images. In response to the selection, the information of the designated materials is transmitted to the lecturer terminal 1a. The lecturer terminal WS displays the designated materials on the CRT 2a and transmits them to the destination terminal 1b. By this construction, the information to be used for the questions and answers may be readily set.

Embodiment of Storage Medium

The above embodiments may be applied to a system comprising a plurality of units or an apparatus comprising a single unit.

Further, a program for operating the constructions of the above embodiments to implement the function of the above embodiments may be stored on a storage medium and the above embodiments may be implemented in accordance with the program stored in such storage medium, and such implementation is within the scope of the present invention and the storage medium storing such program is also within the scope of the present invention.

Such a storage medium may include a floppy disk, a hard disk, an optical disk, a magneto-optical disk, a CD-ROM, a magnetic tape, a non-volatile memory card and a ROM.

The present invention is not limited to the execution of the process by the program stored in the storage medium but the present invention may also be applied to the execution of the operation of the above embodiments on an OS in cooperation with other software or functions of an extension board.

What is claimed is:

1. A communication apparatus comprising:

managing means for managing a plurality of material images to which a transmitting order has been previously determined;

transmitting means for transmitting a first material image of the plurality of material images to an external apparatus; and output means for outputting information to a display device to simultaneously display the first material image on a first area and a second material image on a second area different from the first area, wherein the first material image is the image which has been transmitted by said transmitting means, and the second material image is the image which should be transmitted next to the first material image according to the transmitting order and is not yet transmitted by said transmitting means.

2. An apparatus according to claim 1, wherein magnification is executed on the first image according to an instruction when transmitting the first image.

3. An apparatus according to claim 1, wherein the information relating to the second image is character information corresponding to the second image.

4. An apparatus according to claim 1, wherein said transmitting means transmits the first image to an external device connected to a projector or via a network.

5. An apparatus according to claim 1, wherein the plurality of images include a camera image, a video image or an image prepared by a drawing tool.

6. An apparatus according to claim 1, wherein the image displayed on the second area by a predetermined operation is transmitted by said transmitting means.

7. An apparatus according to claim 1, further comprising controlling means for performing control so that a predetermined material image of which use frequency is high is always displayed on an area different from the first area and the second area.

8. An apparatus according to claim 1, further comprising storage means for storing the plurality of material images managed by said managing means.

9. A communication method, comprising the steps of:

managing a plurality of material images to which a transmitting order has been previously determined;

transmitting a first material image of the plurality of material images to an external apparatus; and outputting information to a display device to simultaneously display the first material image on a first area and a second material image in a second area different from the first area, wherein the first material image is the image which has been transmitted in said transmitting step, and said second material image is the image which should be transmitted next to said first material image according to the transmitting order and is not yet transmitted in said transmitting step.

10. A method according to claim 9, wherein the first image is outputted to the display device in a display form different from a display form of the second image according to an instruction for transmitting the first image.

11. A method according to claim 10, wherein magnification is executed on the first image according to an instruction when transmitting the first image.

12. A method according to claim 10, wherein the information relating to the second image is character information corresponding to the second image.

13. A method according to claim 9, wherein the first image is transmitted in said transmitting step to an external device connected to a projector or via a network.

14. A method according to claim 9, wherein the plurality of images include a camera image, a video image or an image prepared by a drawing tool.

15. A method according to claim 9, wherein the image displayed on the second area by a predetermined operation is transmitted in said transmitting step.

16. A method according to claim 9, further comprising the step of performing control so that a predetermined material image of which use frequency is high is always displayed on an area different from the first area and the second area.

17. A method according to claim 9, further comprising the step of storing the plurality of material images managed in the managing step.

* * * * *

UNITED STATES PATENT AND TRADEMARK OFFICE
CERTIFICATE OF CORRECTION

PATENT NO. : 6,396,514 B1
DATED : May 28, 2002
INVENTOR(S) : Akihiro Kohno

It is certified that error appears in the above-identified patent and that said Letters Patent is hereby corrected as shown below:

<u>Column 1,</u>
Line 27, "wich" should read -- which --.

<u>Column 10,</u>
Line 31, "line" should read -- like --; and
Line 65, "and" should read -- the --.

Signed and Sealed this

Third Day of December, 2002

JAMES E. ROGAN
*Director of the United States Patent and Trademark Office*